United States Patent Office 3,212,422
Patented Oct. 19, 1965

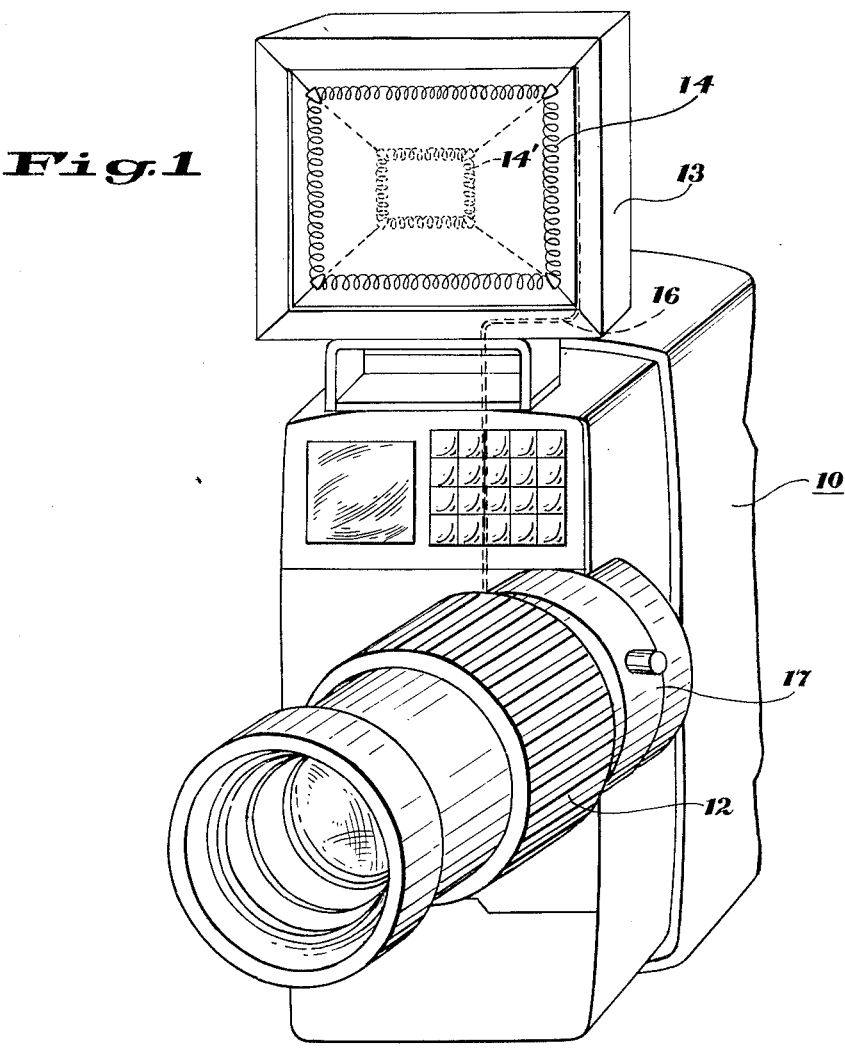

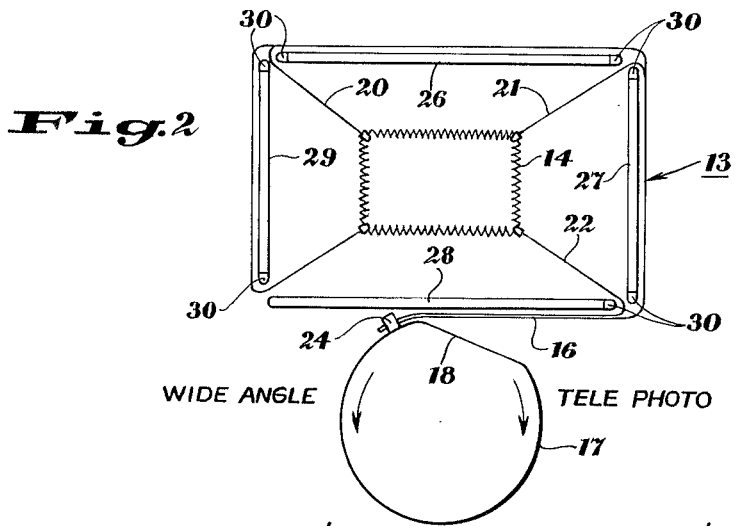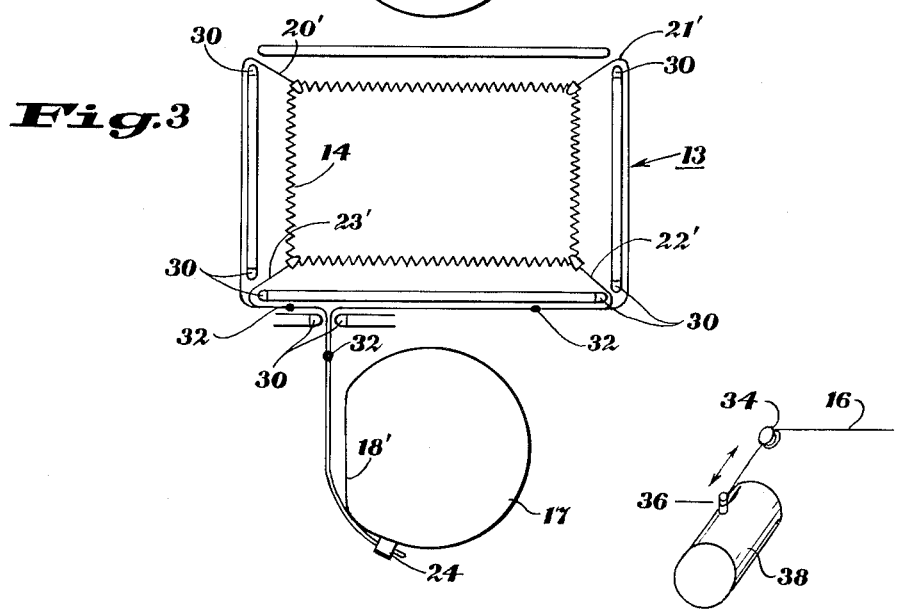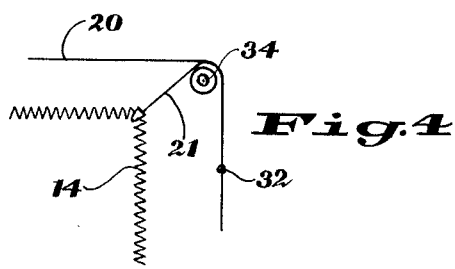

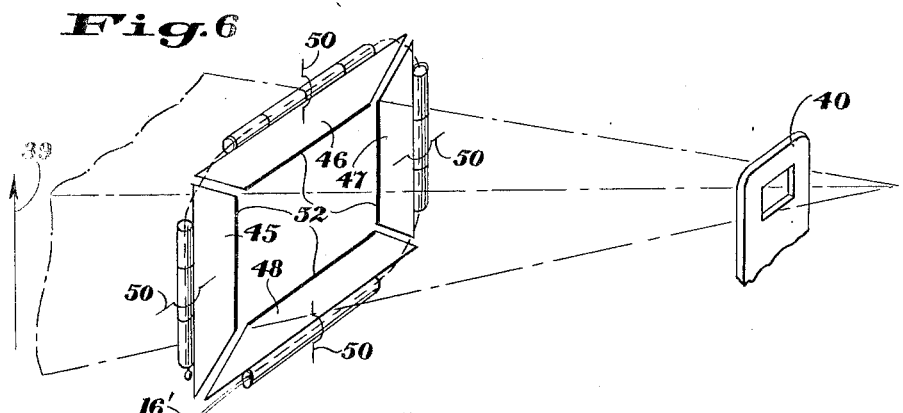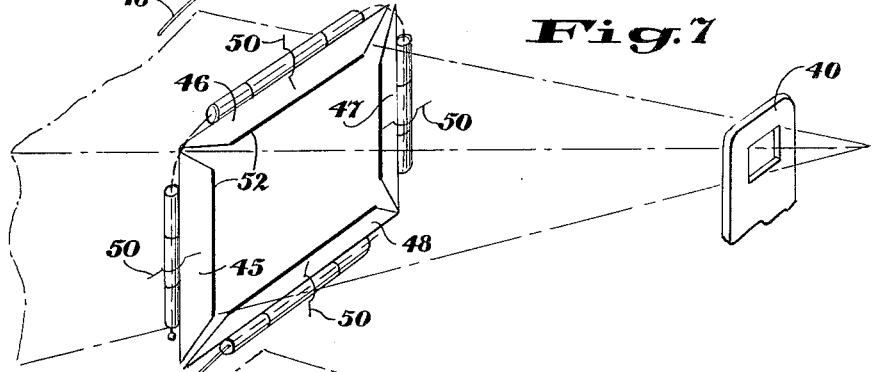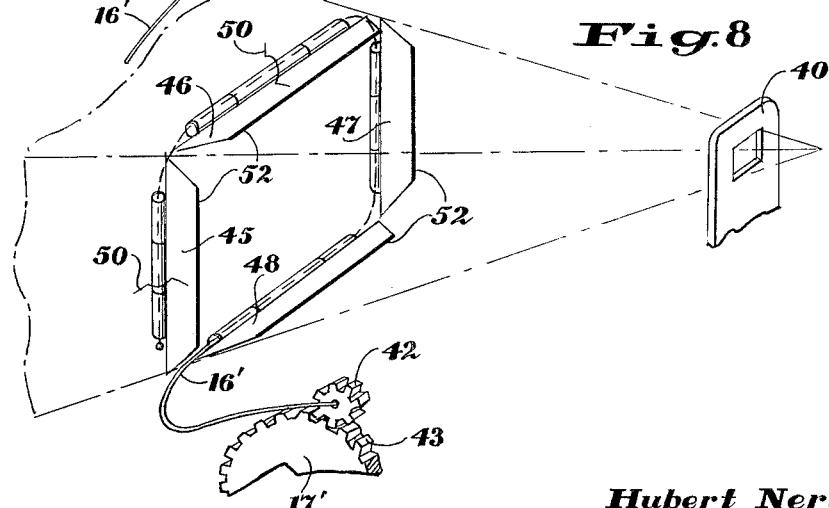

3,212,422
VIEWFINDER FOR ZOOM LENS CAMERAS
Hubert Nerwin and John H. Eagle, Rochester, N.Y., assignors to Eastman Kodak Company, Rochester, N.Y., a corporation of New Jersey
Filed Feb. 20, 1963, Ser. No. 259,915
12 Claims. (Cl. 95—44)

This invention relates to viewfinders, and, more particularly, to viewfinders in which the field viewed is adjustable in accordance with the field presented to a film.

Many viewfinders of cameras are provided with some means for changing the angular field in accordance with the adjustment of the lens of the camera. For instance, still cameras often are provided with interchangeable viewfinding apertures in accordance with various focal lengths available to the camera, with each aperture being suitable for use to locate an objective at only one selected distance. The use of an incorrectly sized viewfinder can result in poor photography when one considers that wide-angle lenses have a field of view greater than 90° and telephoto lenses have a field of view less than 25°. In the case of movie cameras provided with objectives at continuously variable focal lengths, accomplished by means of "zoom" lenses, it is most practicable to have continuously variable viewfinders of some type and preferably viewfinders that may be coupled to the zoom lens so that the field shown in the viewfinder corresponds to that viewed by the lens at each setting.

Viewfinders provided with framing masks that are continuously adjustable and that can be coupled to zoom lenses are known. However, prior art variable masks which simultaneously adjust all four sides of the frame involve complicated structures which make it difficult to obtain simple and reliable operation. Moreover, such complicated arrangements tend to be relatively expensive, particularly in the more economical cameras.

Therefore, a primary object of our invention is to provide a simple and reliable viewfinder having variable framing mask means.

Another object is to provide a viewfinder mask means which is resiliently biased toward a minimum size and which is positively driven from this minimum size in accordance with the position of a movable element of a zoom lens arrangement.

In accordance with one embodiment of the present invention, a framing mask means comprises a rectangular spring assembly adjustably supported at its four corners. The adjustable support at the four corners of the spring is coupled by tensioned cable means to an element of a zoom lens so that as the lens is moved to a position corresponding to what is normally referred to as telephoto, the spring is allowed to contract to a minimum diameter, and as the lens is moved to a wide-angle position, the spring is distended to frame a maximum field of view.

The subject matter which is regarded as our invention is particularly pointed out and distinctly claimed in the concluding portion of this specification. The invention, however, as to its organization and operation together with further objects and advantages thereof, will best be understood by reference to the following description taken in connection with the accompanying drawing in which:

FIG. 1 is a perspective view of a camera arranged to utilize a viewfinder of the present invention;

FIG. 2 is a schematic illustration of one embodiment of the present invention;

FIG. 3 is a schematic illustration of a second embodiment;

FIG. 4 is an enlarged schematic view of one modification;

FIG. 5 is a perspective view of another modification; and

FIGS. 6, 7 and 8 are schematic perspective views of yet another embodiment of the present invention.

Referring now to the drawings, wherein like numbers refer to similar parts, we have shown in FIG. 1 a camera 10 having a zoom lens arrangement 12 and a viewfinder 13. In a rear portion of the viewfinder 13 is an eyepiece (not shown in FIG. 1). Within the viewfinder 13 is a rectangular framing mask means in the form of a spring assembly 14 shown in a distended position and illustrated at 14′, in dashed lines, in a preferred position for narrow-angle, sometimes called telephoto view-finding operations. The spring assembly 14 has sufficient optical density when viewed through the eyepiece to outline, by means of the four laterally movable spring portions, a subject within a region which will be presented the film by the lens arrangement 12 when a shutter (not shown) is opened. By laterally movable, as used herein, we mean that parallel framing lines move toward or away from each other and from the center of the rectangle defined thereby.

In order that the relationship between the lens position and the masking frame is at all times corresponding, the four corners of the spring assembly 14 are coupled to a movable member of the zoom lens 12 by a cable 16. Thus, rotation of a lens member 17 of the zoom lens 12 will control the position of the cable 16 to regulate the area within the spring arrangement. As illustrated in FIG. 1, the framing of the spring assembly 14 is positioned for wide-angle viewfinding by counterclockwise rotation of the lens member 17. Clockwise rotation of the lens member 17 releases the cable 16 and allows the spring arrangement to contract for telephoto operation.

Referring now to FIG. 2, since the relationship between the rotation of the lens member 17 and the photographic field of view is not always linear, we have provided a non-circular peripheral camming surface 18 on the lens member 17 for providing a non-linear relative motion of the cable 16 and the lens member 17. Also in FIG. 2, we have shown one cable arrangement wherein four separate strands 20, 21, 22, and 23 are coupled directly to a pin 24 on the lens member 17. The strands are all of different lengths, and each is slidingly journalled over frame locating members 26, 27, 28, and 29, respectively.

The frame locating members assure that the strands move in a manner enhancing proper proportions of the spring assembly 14 relative to the image presented to the film. Usually, the strands themselves are fabricated from a tough material able to withstand repeated flexing and considerable frictional wear. Certain glass rope strands are suitable in this application, as are various metal alloys. The framing locaters 26–29 are also arranged to withstand repeated frictional wear, and we prefer that they be provided with metal insert guides 30 at each bend of each strand to prevent dimensional instability of the entire arrangement.

As illustrated in FIG. 3, the cam surface 18′ is of a somewhat different contour to match a different lens system. Also, the cable arrangement may be symmetrical, whereby the strands 20′ and 21′ are substantially longer than the strands 23′ and 22′ respectively. With such an arrangement, no rotational force is developed on the viewfinder 13 itself. Moreover, the strands 21′ and 22′ may be coupled together by a fused connection 32, and the strands 20′ and 23′ may be similarly coupled. The location of the fused couplings 32 is selected where unfused strands would have parallel motion throughout the range of motion contemplated in the present invention. Also, the cable 16 presented to the actuating pin 24 may be a single strand by providing an additional fused coupling 32 between the remaining strands.

Referring now to FIG. 4, in some applications of the present invention, we prefer to utilize pulley rollers 34 in place of the insert guides 30 and the framing locaters 26–29 to minimize wear of the viewfinder framing locater members. These rollers 34 are used at each turn of the individual strands or of the cable 16.

Refering now to FIG. 5, similar pulley rollers 34 may be utilized to couple the cable 16 to a pin 36 which is secured to a lens member 38. Such a cable guide arrangement is useful in effecting certain relative motions of the lens system and the cable 16 particularly when the lens member 38 move longitudinally with the lens system instead of rotating as does the pin 24 described above. Also, some members of such a lens arrangement suffer both longitudinal and rotary motion during zoom operation. Securing the cable 16 to selected locations on such a member will also provide satisfactory movement thereof.

Referring now to FIGS. 6, 7 and 8, a somewhat different embodiment of the present invention is illustrated in perspective. As is more easily illustrated in a perspective view, a subject 39 may be viewed through an eyepiece 40 and the transparent framing mask means. In FIGS. 6, 7 and 8, the framing means includes four separate framing members which are coupled by a rotatable cable 16′ to a gear drive arrangement 42–43. We prefer that the gearing 43 be a peripheral surface of the lens member 17′ which rotates continuously with focusing from telephoto to wide angle. However, the relative movement of certain lens elements is such that a modified worm gear drive is most feasible.

The four transparent flaps or shutters 45, 46, 47 and 48 are each hingedly secured within the viewfinder 13 (FIG. 1) and resiliently coupled thereto by springs 50 which bias them toward the closed position illustrated in FIG. 6. In this closed position, the framing lines 52, which are darkened edges of the shutters 45–48 define a minimum aperture suitable for telephoto operation of the camera. As the lens arrangement 12 is operated to accomplish medium-range photography, as in FIG. 7, the rectangular framing lines 52 are each moved laterally outward to define side portions of a greater aperture by rotation of the cable 16′ in accordance with the position of the lens member 17′. Similarly, for wide-angle operation, the framing lines 52 are at a maximum extended position as illustrated in FIG. 8. Though the corners are not defined in a wide-angle operation, the definition of the sides is sufficient for the photographer to know what portion of the subjects in front of the camera are within the field of view of the camera lens arrangement.

It should be noted that both embodiments of our invention provide visibility on the outside of the defined frame throughout most positions of the framing mask means. This feature allows the photographer to consider objectives that are about to enter the field of view of the lens arrangement 12 as well as those presently therein.

While we have shown and described particular embodiments of the present invention, other modifications may occur to those skilled in this art. For instance, in the event circular pictures are desired, the framing mask means could be arranged in hexagonal or octagonal configurations to define a field of view substantially corresponding to a circular image to be presented to a film. We intend, therefore, to have the appended claims cover all modifications which fall within the true spirit and scope of our invention.

We claim:

1. A variable viewfinder for a camera having a lens arrangement adjustable throughout substantially different angles of view, comprising:
   a rectangular framing mask means having four laterally movable optically dense outlining means resiliently biased to reduce an aperture defined thereby to a minimum framing size and positionable with respect to an eyepiece to allow viewing of at least a portion of a subject;
   a lens system coupled to said framing mask means to have a field of view similar to that defined by said framing mask means;
   a movable element in said lens system that progresses continuously in one direction as focusing in the direction of the subject is accomplished from narrow-angle to wide-angle; and
   cable means connecting said movable element to said framing mask means so that the reducing bias is overcome and the aperture of said framing mask means increases as said element moves toward the wide-angle position to provide a viewfinder field of view corresponding to that to be presented to a film arranged to receive an image through said lens system.

2. A variable viewfinder for a camera having a lens system adjustable throughout substantially different angles of view, comprising:
   a camera;
   a viewfinder securable to said camera;
   a variable rectangular framing mask means within said viewfinder and including four line forming means which are laterally movable and resiliently biased to be reduced to a minimum framing size;
   a lens arrangement secured to said camera to have a field of view corresponding to that of said framing mask means;
   a movable element in said lens arrangement that progresses continuously in one direction during focusing from narrow-angle to wide-angle; and
   tensioned cable means connecting said movable element to said framing mask means so that the reducing bias is overcome and the aperture of said framing mask means increases as said element moves toward the wide-angle position to provide a viewfinder field to view corresponding to that to be presented to a film arranged to receive an image through said lens arrangement.

3. A variable viewfinder for a camera having a lens system adjustable throughout substantially different angles of views, comprising:
   a viewfinder securable to the camera;
   a variable framing mask means within said viewfinder and including a plurality of laterally movable line forming tension spring portions supportable at the corners of the figure formed thereby;
   a lens arrangement secured to the camera to have a field of view corresponding to that of said viewfinder;
   a movable element in said lens arrangement that progresses continuously in one direction during focusing from narrow-angle to wide-angle; and
   tensioned cable means connecting said movable element to each of the corners of the spring portions so that the tensioning thereof is overcome and the aperture of said framing mask means increases as said element moves toward the wide-angle position to provide a viewfinder field of view corresponding to that which will pass through said lens arrangement.

4. A variable viewfinder for a camera having a lens arrangement adjustable throughout substantially different angles of view, comprising:
   a viewfinder securable to the camera;
   a variable rectangular framing mask means within said viewfinder and including four line-forming tension spring arrangements supportable at the corners of the rectangle formed thereby;
   a variable lens secured to the camera having a field of view corresponding to that of said viewfinder;
   a movable element in said lens that progresses continuously in one direction during focusing from telephoto to wide-angle;
   tensioned cable means connecting said movable element to each of the four corners of the spring arrangement so that the tensioning thereof is overcome and the aperture of said framing mask means increases as said movable element moves toward the wide-angle position; and framing locater members arranged to guide the portion of said cable means secured to each corner of the spring arrangement for moving each corner along a diagonal line of the rectangle to maintain a dimensional relationship between adjacent spring side.

5. A viewfinder as in claim 4, in which the framing locater members are pulley rollers.

6. A viewfinder as in claim 4, in which the tensioned cable means is symmetrically arranged so that torsional forces developed by the tension thereof are balanced with respect to said viewfinder.

7. A viewfinder as in claim 4, in which the tensioned cable means comprises a plurality of strands which engage each of the corners respectively and which are fused together at points having parallel motion throughout the range of movement attained during operation so that a single strand is coupled to the movable element in the lens.

8. A variable viewfinder for a camera having a lens arrangement adjustable throughout substantially different angles of view, comprising:

a viewfinder securable to the camera;
a variable framing mask means within said viewfinder and including a plurality of transparent, hinged shutters, each having an optically dense line-forming edge remote from its hinge support;
a tension spring arrangement engaging each of said shutters to bias them to provide a minimum aperture;
a variable lens secured to the camera having a field of view corresponding to that of said viewfinder;
a movable element in said lens that progresses continuously in one direction during focusing from telephoto to wide-angle; and
tensioned cable means connecting said movable element to each of the shutters so that the tensioning thereof overcomes the spring bias and the aperture of said framing mask means increases as said element moves toward the wide-angle position.

9. A variable viewfinder for a camera having a lens arrangement adjustable throughout substantially different angles of view, comprising:

a viewfinder securable to the camera;
a variable rectangular framing mask means within said viewfinder and including four transparent, hinged shutters, each having an optically dense line-forming edge remote from the hinge support;
a variable lens secured to the camera having a field of view corresponding to that of said viewfinder;
a movable element in said lens that progresses continuously in one direction during focusing from telephoto to wide-angle; and
cable means rotatably connecting said movable element to each of the four shutters so that the tensioning thereof by movement of said element regulates the aperture of said framing mask means to correspond with the field of view of said lens.

10. A variable viewfinder for a camera having a lens arrangement continuously adjustable throughout substantially different angles of view, comprising:

a viewfinder securable to the camera and having a field of view at least as great as the usable maximum field of view of the lens arrangement;
a variable rectangular framing mask means within said viewfinder and including four line forming means which means is laterally movable within the region and resiliently biased to be reduced to a minimum framing size;
a movable element in the lens arrangement that progresses continuously in one direction during focusing from telephoto to wide-angle; and
tensioned cable means connecting said movable element to said framing mask means so that the reducing bias is overcome and the rectangular aperture of said framing mask means increases as said element moves toward the wide-angle position to provide a viewfinder field of view corresponding to that to be presented to a film arranged to receive an image through the lens arrangement.

11. A variable viewfinder for a camera having a lens arrangement adjustable to include subjects within substantially different angles of view, comprising:

a lens arrangement secured to the camera;
a viewfinder securable to the camera and having a field of view at least as great as the usable maximum field of view of said lens arrangement;
a variable framing mask means within said viewfinder and including four line forming means so that the four lines formed thereby are laterally movable and resiliently biased to be reduced to a minimum framing size;
a movable element in said lens arrangement that progresses continuously in one direction during focusing from telephoto to wide-angle; and
tensioned cable means connecting said movable element to said framing mask means so that the reducing bias is overcome and the aperture of said framing mask means increases as said element moves toward the wide-angle position to provide a viewfinder field of view corresponding to that of said lens arrangement.

12. A variable viewfinder for a camera having a lens arrangement continuously adjustable throughout substantially different angles of view, comprising:

a viewfinder securable to the camera and having a substantially unrestricted view at least as great as that usable by the lens arrangement;
a variable framing mask means within said viewfinder and including a plurality of line forming tension spring portions supportable at the corners of the figure formed thereby and laterally movable through a major portion of the field of view of said viewfinder to define selected portions thereof;
a movable element in the lens arrangement that progresses continuously in one direction during focusing from telephoto to wide-angle; and
tensioned cable means connecting said movable element to each of the corners of the spring portions so that the tensioning thereof is overcome and the aperature of said framing mask means increases as said element moves toward the wide-angle position to provide a viewfinder field of view corresponding to that which will pass through the lens arrangement.

References Cited by the Examiner

UNITED STATES PATENTS

| | | | |
|---|---|---|---|
| 1,401,591 | 12/21 | Doggett | 88—1.5 X |
| 2,247,104 | 6/41 | Takacs | 88—1.5 X |
| 2,917,968 | 12/59 | Nojiri | 88—1.5 |
| 3,017,815 | 1/62 | Keznickl | 95—44 |

NORTON ANSHER, *Primary Examiner.*

JOHN M. HORAN, *Examiner.*